US009800636B2

(12) United States Patent
Jellison, Jr. et al.

(10) Patent No.: US 9,800,636 B2
(45) Date of Patent: Oct. 24, 2017

(54) MEDIA ASSET DISTRIBUTION WITH PRIORITIZATION

(71) Applicant: Clear Channel Management Services, Inc., San Antonio, TX (US)

(72) Inventors: David C. Jellison, Jr., Ogallala, NE (US); Martin Blazek, Ogallala, NE (US)

(73) Assignee: IHEARTMEDIA MANAGEMENT SERVICES, INC., San Antonio, TX (US)

( * ) Notice: Subject to any disclaimer, the term of this patent is extended or adjusted under 35 U.S.C. 154(b) by 254 days.

(21) Appl. No.: 14/036,296

(22) Filed: Sep. 25, 2013

(65) Prior Publication Data
US 2015/0089016 A1   Mar. 26, 2015

(51) Int. Cl.
*H04L 29/06* (2006.01)
*H04N 21/262* (2011.01)
*H04N 21/6587* (2011.01)
*H04N 21/845* (2011.01)

(52) U.S. Cl.
CPC .......... *H04L 65/60* (2013.01); *H04L 65/4076* (2013.01); *H04L 65/602* (2013.01); *H04N 21/26241* (2013.01); *H04N 21/26258* (2013.01); *H04N 21/6587* (2013.01); *H04N 21/8456* (2013.01); *H04L 65/4084* (2013.01)

(58) Field of Classification Search
CPC ............. H04N 21/262; H04N 21/2625; H04N 21/26258; H04N 21/234345; H04N 21/23439; H04N 21/23608; H04N 21/23611; H04N 21/242
See application file for complete search history.

(56) References Cited

U.S. PATENT DOCUMENTS

| 2003/0068046 A1* | 4/2003 | Lindqvist .......... G06F 17/30867 380/277 |
| 2003/0084108 A1* | 5/2003 | Syed ...................... H04H 60/06 |
| 2009/0292458 A1* | 11/2009 | Nakamura et al. .... G01C 21/32 |
| 2011/0295978 A1* | 12/2011 | Pazos .................. H04H 20/426 709/219 |
| 2013/0103642 A1* | 4/2013 | Zhang ................. G06F 17/3012 |

(Continued)

Primary Examiner — Chris Parry
Assistant Examiner — Soe M Hlaing
(74) Attorney, Agent, or Firm — Garlick & Markison; Edward J. Marshall

(57) ABSTRACT

Media items for broadcast or streaming can be created or otherwise obtained by a media distribution system. The media items can be transferred from the media distribution system to a media delivery system over a communications network, in an order determined by the media distribution system. The media delivery system decides how important the media items being transferred are, based for example, on a broadcast schedule known to the media delivery system; assigns a temporal priority to the media items; and provides feedback to the media distribution system regarding the temporal priority. The media distribution system adjusts the order in which media items are transferred based on the temporal priority feedback from the media delivery system. The media distribution system can provide a list of upcoming media item transfers, to allow the media delivery system to provide feedback before the media items are transmitted.

17 Claims, 4 Drawing Sheets

(56) References Cited

U.S. PATENT DOCUMENTS

2013/0120570 A1* 5/2013 Stanley et al. .......... H04L 65/80
2013/0185452 A1* 7/2013 Burckart et al. ..... H04L 65/4084
2014/0130104 A1* 5/2014 Ruffini ............... H04N 21/2181

* cited by examiner

MEDIA ASSET DISTRIBUTION WITH PRIORITIZATION

BACKGROUND OF THE INVENTION

Technical Field of the Invention

The disclosure relates generally to transferring media items over a network, and more particularly to transferring media items based on a priority determined by the receiving system.

Description of Related Art

In the media broadcast industry, content is often created or obtained by one system operating at a first location or market, and provided to other systems operating at different locations or in different markets. Some broadcasters own, or are affiliated with, broadcasters and streaming media providers in many different markets and in many different locations. These broadcasters may desire to provide similar, although not identical content to multiple different markets and locations.

Currently, media items can be distributed to each of the different markets or locations using conventional techniques and protocols, such as the file transfer protocol (FTP). Often, the system being used to distribute the files simply transmits the media files via FTP in the same order in which the media files are created or received. Sometimes, files received at the different markets and locations are duplicates of media items already accessible to the receiving system, resulting in unnecessary use of system resources. In other instances, the order in which files are conventionally transferred is not ideal for the receiving system. Thus, it is apparent that conventional techniques are less than perfect.

BRIEF DESCRIPTION OF THE SEVERAL VIEWS OF THE DRAWINGS

Aspects of this disclosure will become apparent upon reading the following detailed description and upon reference to the accompanying drawings, in which like references may indicate similar elements.

DETAILED DESCRIPTION OF THE INVENTION

Figure 1:
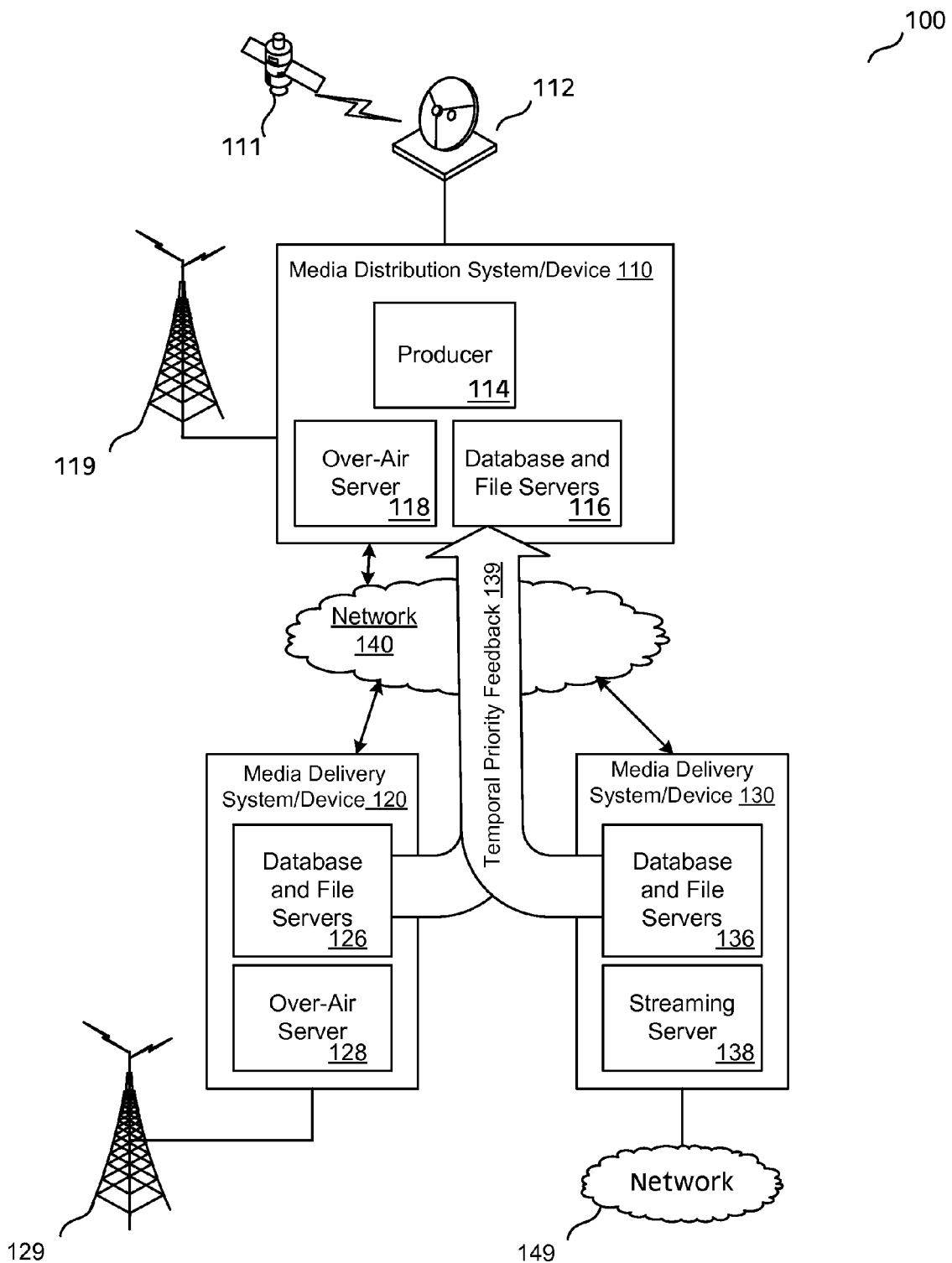
FIG. 1 is a block diagram illustrating a system for transmitting media items according to various embodiments of the present disclosure.

The following is a detailed description of embodiments of the disclosure depicted in the accompanying drawings. The embodiments are described in such detail as to clearly communicate to one of ordinary skill how to make and use the claimed invention. However, the amount of detail offered is not intended to limit the anticipated variations of embodiments; on the contrary, the intention is to cover all modifications, equivalents, and alternatives falling within the spirit and scope of the present disclosure as defined by the appended claims.

Various embodiments described herein alter the order of media items and assets transmitted by a media distribution system or device based on temporal priority feedback from media distribution systems or devices receiving the media items. The temporal priority feedback can be determined by the media distribution systems based on a broadcast or streaming schedule known to the media distribution system. The temporal priority assigned to a media item by the media delivery system can also depend on whether the media delivery system already has access to the media item being considered.

The media distribution system can, in some cases, send a preview message identifying media items queued for transmission by the media distribution device or system in the near future. The media distribution device can establish a temporal priority of some or all of the media items identified in the preview message, and send temporal priority feedback to the media distribution device or system, which can stop or alter a default order of media items or other assets being transmitted WANcast™ based on the feedback.

Certain terms used in claiming and describing the various embodiments are intended to have particular meanings as set forth in the following paragraphs. For example, the term media distribution device refers to a collection of one or more computing devices that are capable of WANcasting®, or otherwise transferring media items or assets to a media delivery system. The term media delivery device is used herein to refer to a collection of one or more computing devices that are capable of receiving media items or assets via WANcasting® or otherwise, and delivering media items and assets to end-user devices for consumption by media consumers.

The terms WANcast™ and WANcasting® refer, generally, to transferring media items, schedules and other assets from one radio automation system to another, or from a media distribution device to a media delivery device, via a packet-switched network. Despite the fact that WANcasting® refers to a specific form of media asset transfer or distribution, unless specifically specified or required by the context, the term WANcasting® and its derivatives are used herein interchangeably with the phrases "media asset transfer," and "media asset distribution."

The term "temporal priority" refers to a priority related to time, as opposed to a priority based on some other metric. Consider, for example, a paid commercial spot that is assigned a higher priority than an unpaid commercial spot by a salesman, because the paid commercial spot will generate revenue. Consider also that the same paid commercial spot is not scheduled for broadcast until 12 hours from a current time, but the unpaid commercial spot is scheduled for broadcast in 2 hours. The temporal priority of the paid commercial spot would be lower than the unpaid commercial spot, despite the fact that the paid commercial spot has been assigned a higher non-temporal priority by the salesman.

Adjusting an order of a media asset transfer" and "stopping or altering" a media asset transfer, encompass adding, deleting, rearranging, truncating, appending, pre-pending, inserting and substituting media items scheduled for WANcasting® or currently in the process of being WANcast™.

The term "media items," "assets," and "content" are used interchangeably throughout this disclosure. Unless otherwise indicated by context or specifically indicated, each of these terms includes both media items such as advertisements, talk and music programs, station identifiers, radio personality segments, songs and comedy bits, and associated metadata.

Referring first to FIG. 1, a system 100 for transmitting media items according to various embodiments of the present disclosure is illustrated and discussed. In some embodiments, a system 100 can include one or more processing systems or devices communicatively coupled via a packet-switched network, such as network 140. For example, system 100 includes media distribution system/device 110 and media delivery systems/devices 120 and 130, each of which are processing systems communicatively coupled via network 140. Media distribution system/device 110 and media delivery systems/devices 120 and 130 include database and file servers 116, 126, and 136, which can store various data associated with broadcast functions of one or more processing systems in system 100, including, without limitation, content items, metadata associated with one or more media or content items, processing system broadcast logs, broadcast schedules, and the like. Media or content items can include, without limitation, some or all of media programs, advertisements, voice-tracks, and logs. Media or content items can also include one or more of audio and video content. For example, a media or content item can include an audio radio program that is broadcast from a broadcast station.

Media distribution system/device 110 and media delivery systems/devices 120 and 130 can include one or more broadcast stations used to deliver content, with some or all system elements and subsystems co-located in a single physical facility. For example, in the illustrated embodiment, media distribution system/device 110 and media delivery system/device 120 can include radio broadcast stations that broadcast content over broadcast towers 119 and 129, respectively, as radio broadcasts; media delivery system/device 130 can be a broadcast station that streams content to end user devices over a network. In some embodiments, Media distribution system/device 110 and media delivery systems/devices 120 and 130 can be remotely-located from each other, which can include being in different physical locations, including, without limitation, different broadcasting markets, cities, geographic regions, time zones, and the like. In at least one embodiment, media distribution system/device 110 can generate and distribute media items and content to media delivery systems/devices 120 and 130, but does not itself broadcast or otherwise deliver media items to end user devices.

In some embodiments, Media distribution system/device 110 and media delivery systems/devices 120 and 130 each include one or more servers for distributing media content and assets via WANcasting®, or other media asset distribution process. For example, media distribution system device 110 and media delivery systems/devices 120 and 130 can each execute radio automation software, for example Zetta®, NexGen®, or some other radio automation software that allows media items to be WANcast™ or distributed from one system or device to another over network 140. The remaining discussion will focus on embodiments in which media distribution system/device 110 distributes assets to media delivery systems/devices 120 and 130, which in turn broadcasts media via radio tower 129 or stream via network 149 to end-user devices. However, disclosure related to embodiments specifically discussed applies equally to embodiments in which media delivery device 120 distributes media items to media delivery service 130, or in which media delivery service 130 distributes media items to media distribution system 110.

Media distribution system 110 can include producer 114, referred to herein interchangeably as a production machine, which can produce media items to be provided to end-user devices by media delivery systems/devices 120 and 130. In some embodiments, producer 114 can obtain information, including various content items, from various content sources, including, without limitation, broadcasts in other markets received via one or more networks, bulk content storage, and programming broadcast via a satellite, which can be received via a satellite receiver. For example, in the illustrated embodiment, media distribution system 110 is coupled to a satellite receiver 112 which receives content broadcast via satellite 111, such that content received at satellite receiver 112 is produced via producer 114 and provided via broadcast tower 119. Producer 114 can be scheduled to record, as one or more separate data files, content received via satellite receiver 112 over a certain time period. In some embodiments, production of a media item can include processing the received ("ingested") content item into a format suitable for one or more of storage in a database and distribution. For example, in the illustrated embodiment, a content item received via satellite receiver 112 can be recorded by producer 114 as a data file and stored in a computer-usable storage medium. Recording a content item can include saving the content item in a different format than the format in which it was received. For example, a content item received as an analog broadcast can be recorded as a data file in a digital format, including, without limitation, a ".wav" file format.

In some embodiments, content produced by producer 114 can be transferred to other processing systems via a connection over a network, such that the content is not produced at the other processing systems. As a result, media delivery systems 120 and 130 can receive produced content items from media distribution system 110 rather than producing the content items locally. In some embodiments, content items are transferred between a database at media distribution system 110 and databases included in media delivery systems/devices 120 and 130 for delivery or further distribution of transferred media items and other content independently of a requirement to produce the content locally.

In some embodiments, content produced by producer 114 is stored at media distribution system 110 in one or more database and file servers 116, and the content can be transferred from the database and file servers 116 to database and file servers 126 and 136 at media delivery systems 120 and 130. In various embodiments, content received and produced at media distribution system 110 can be initially transferred to a media delivery system 120 or 130, which subsequently transfer some or all of the media items or other content another media delivery system. In some implementations, media distribution system/device 110 can manage transfers of content between processing systems 120 and 130, or include metadata that controls or limits redistribution by media delivery systems 120 and 130.

In some embodiments, processing systems to which content can be transferred, for example via WANcasting®, are mapped to each other such that a processing system is configured to access information associated with the various processing systems to which it is mapped, establish connections with the processing systems over one or more networks, and transfer content to the processing systems via the connection. Transferring content between processing systems via a media asset transfer such as WANcasting® can include copying a data file comprising a media item between two processing systems based on one or more of an IP address associated with one or more processing systems and a UDP protocol. Utilizing a media asset transfer such as WANcasting® to transfer content to a processing system can be accomplished based upon automated processes, such that the process of producing content at a first processing system and transferring the produced content to a receiving processing system's database without a need for manual intervention at one or both of the first processing system and the receiving processing system. Furthermore, in some embodiments, content received by a receiving processing system can be populated into a broadcast playlist without manual intervention, thereby enabling receipt and distribution of remotely-produced content without manual intervention at the receiving processing system.

In some cases, media distribution system 110 selects an order in which to distribute data to media delivery systems/devices 120 and 130. In some implementations, the data includes media items that are initially distributed using a first-in-first-out (FIFO) protocol, in which media items are transferred in the same order in which the media items are received or created. In some such embodiments, this may or may not result in media items being distributed to media delivery system/device 120 in the same order as the media items are distributed to media delivery system/device 130.

In other embodiments content is initially distributed in some other order determined by media distribution system 110. The order can be determined according to master schedule, according to a media delivery schedule used by over-air server 118, according to various business rules related to user or station preferences, size, rankings or ratings of particular media items or groups of media items, and non-temporal priority of the content being distributed. In such cases, the initial order of the media items distributed to media delivery system/device 120 can be different than the order of media items distributed to media delivery system/device 130.

Media delivery systems/devices 120 and 130, evaluate the media items being distributed by media distribution system 110 to determine a temporal priority of the media items or assets. This evaluation can be performed upon receipt of a file including media items or assets. In other embodiments, the evaluation can be performed upon receipt of a preview message transmitted by media distribution system that identifies media items expected to be distributed. The media delivery systems 120 and 130 individually send temporal priority feedback 139 to media distribution system 110, which uses the temporal priority feedback to adjust the order in which media files are distributed to the individual media delivery systems. The adjusted order can result in each media delivery system receiving distributed media files or assets in a different order.

The temporal priority feedback 139 can include temporal priority indicators associated with individual media items, media item identifiers, file identifiers, time markers, or the like. In some embodiments, the temporal priority indicator can be associated with more than one media item. The temporal priority indicator can, in some embodiments, indicate the temporal priority determined by the media delivery system, a temporal priority delta indicating a requested change in the temporal priority compared to an earlier temporal priority value, or other information related to the temporal priority that can be used by the media distribution system/device 100 to update or confirm the order in which media items are being distributed.

Figure 2:
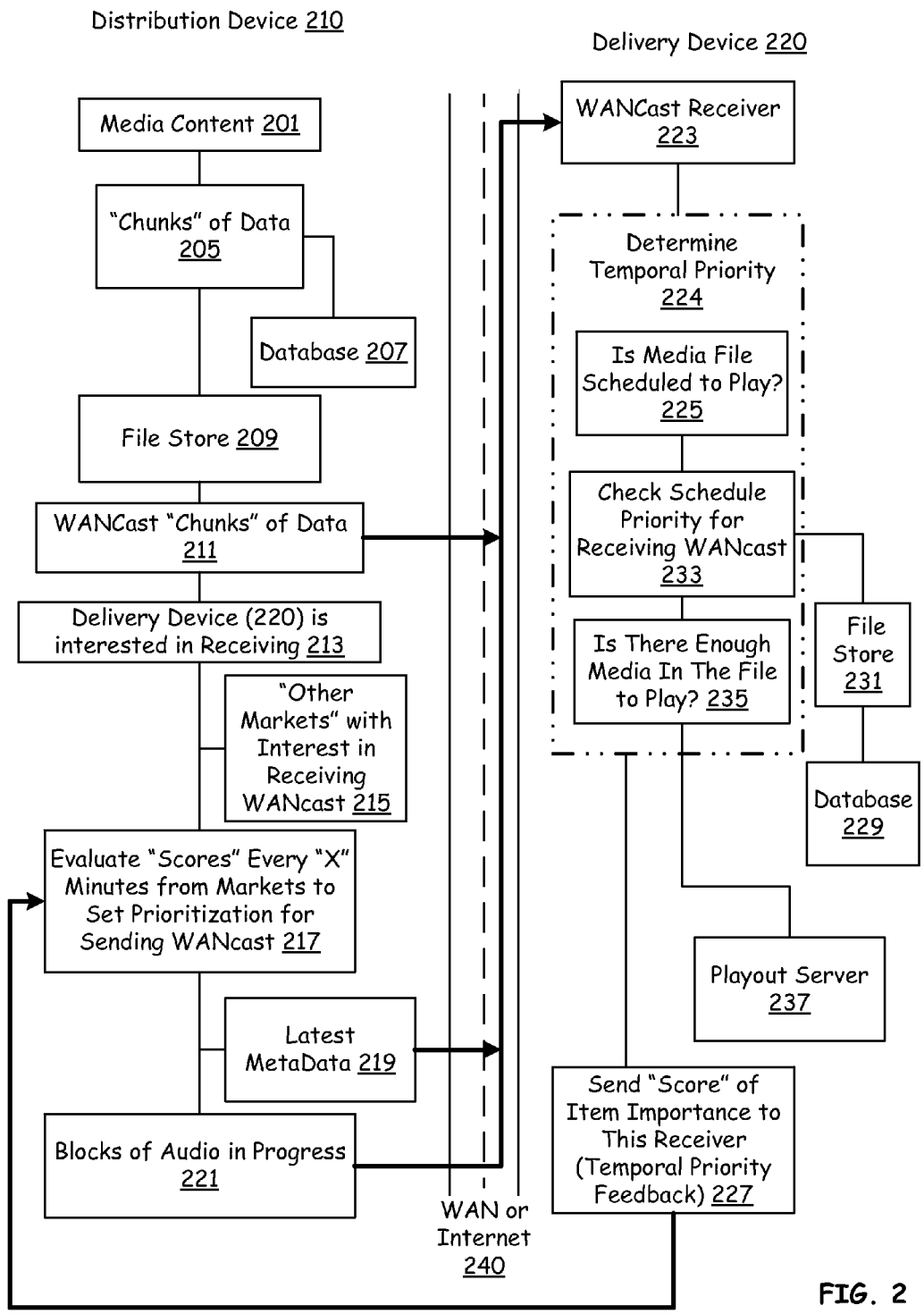
FIG. 2 is a block diagram illustrating the use temporal priority feedback in a media distribution process according to various embodiments of the present disclosure.

Referring to FIG. 2, the use temporal priority feedback in a media distribution process priority is discussed according to various embodiments of the present disclosure. The left hand side of FIG. 2 illustrates tasks performed by, or on behalf of, media distribution device 210. The right hand side of FIG. 2 illustrates tasks performed by, or on behalf of, media delivery device 220.

As illustrated by block 201, media content is received, created, or generated by distribution device 210. At block 203, a media asset distribution process, by which assets such as media items, metadata and other content are prepared for distribution to one or more delivery devices, such as delivery device 220. These delivery devices can be located in markets different from each other and from distribution system 210.

The data to be WANcast™ can be broken into chunks, as illustrated by block 205. The data can be divided into different sized chunks for different delivery devices, or for different transmissions. The size of the chunks can be based on a broadcast or streaming schedule, for example all of the data for a broadcast hour, daypart, day or commercial-free segment can be chunked together, or the data can be chunked so that each chunk of data includes a single media item and associated metadata. In some embodiments, a set number of media items, either with or without metadata are included in a single chunk of data. In other embodiments, some chunks are limited to media items, while other chunks are limited to metadata. The data chunks can be stored in the system database 207 for later retrieval and use by distribution device 210. In some embodiments, data is chunked on a per-media item basis for storage in system database 207, and can be chunked differently for distribution.

As illustrated by block 209, the data chunks can be placed into a file store, with each file in the file store representing one or more media items. The files can also include metadata associated with each file included in the file store, or may include a pointer to the location of the metadata. In cases where data is chunked so that a single file includes multiple media items, a separate index file, identifying the media items included in the data file can be maintained by distribution device 210. In some embodiments, the index file can identify media items included in multiple data files.

As illustrated by block 211, the chunks of data are prepared for media asset distribution, such as WANcasting®. In some embodiments, the index file is pre-pended to a data file before the data file is distributed. In other embodiments, the index file is included in a separate preview message transferred in advance of distributing the chunked data. Pre-pending the index file or sending a separate preview message can allow a receiving device to identify the media items, and provide feedback or take other action, before the media items are actually received.

As illustrated by block 213, distribution device 210 receives an indication that delivery device 220 is interested in receiving the media assets. The indication can be received as a network communication from delivery device 220, for example in a message generated in response to receipt of an initial portion of the media asset transfer. The indication can also be obtained from a media distribution list stored in a local or network memory, or from preferences obtained during registration of a media delivery device or system.

As illustrated by block 215, multiple delivery devices or systems, any or all of which may be located in different geographic locations or serve different markets, can express an interest in receiving media asset distributions from distribution device 210. The indication of interest can take the form of temporal priority feedback that includes a temporal priority indicator, for example a score. The score, or other temporal priority indicator, can apply to each media item individually, to a group of media items included in a media asset transfer, or to the media asset transfer as a whole. Furthermore, each delivery device can provide its own, unique score that indicates a temporal priority from the perspective of the device, system, or market providing the score.

As illustrated by block 217, the temporal priority feedback received from the various delivery devices or systems can be evaluated at designated times to determine whether the order of media items being distributed is optimal. The evaluation can be performed after expiration of a predetermined number of minutes, as illustrated, but other time periods can be used. Furthermore, the interval between evaluations need not be a set time period, but instead could occur after each chunk of data has been transferred using a varying time period based on the temporal priority feedback received from delivery device 220, or on-demand. For example, if media items being distribution consistently result in few or no changes to the distribution order based on the temporal priority feedback, the time between evaluations can be increased. Thus, evaluations are performed every 10 minutes, and for the last 60 minutes the temporal priority feedback messages received from delivery device 220 require less than a threshold number of changes to be made to the order of media items being distributed, the interval between evaluations can be increased to 12 minutes. Likewise, the interval between evaluations can be decreased if temporal priority feedback consistently requires adjustments to be made to the order of media items being distributed. Recall, that adjustment of an order of media items includes removing, adding, and substituting media items or other content.

In some embodiments, the process of evaluating the scores, as shown by block 217, can include comparing a score included in the temporal priority feedback to an estimated temporal priority score determined by the distribution device. In other embodiments, a go/no go score can be used to indicate either that a particular media item or group of media items is needed immediately, or not needed immediately.

In some instances, a preview message from distribution device 210 can not only identify media items that will be distributed, but can indicate a period of time in which the media items are scheduled to be transferred. For example, a first preview message can include media items to be transmitted in the next media asset transfer period, and a second preview message can indicate media items to be included in a subsequent media asset transfer period. Alternatively, a preview message can include a list of media items to be distributed during the next hour, along with an indication of a period of time until the media items are due to be distributed. Thus, for example, a preview message can indicate that the first fourteen songs on the list will be distributed in the next 5 minutes, while songs 15-28 will be distributed beginning 10 minutes after distribution of the first fourteen songs. In some such cases, the temporal priority indication or score can indicate that a media item scheduled for later distribution should be transferred at an earlier time, and vice-versa. For example the score can indicate that song number 25 should be distributed before song 8, and that song 5 is not needed until after song 17.

In some cases, a media item scheduled to be streamed or broadcast is not included in either a preview list or in a chunk of data being WANcast™, or otherwise distributed. In some such instances, the temporal priority feedback can include a specific request for media item, along with the temporal priority of the requested media item.

As illustrated by block 219, after the order of the media items being distributed is adjusted as needed, the latest metadata for the media items being distributed can be provided to delivery device 220. Block 221 illustrates that that the media items can be distributed, for example by WANcasting® to delivery device 220 in the adjusted order, in accordance with the temporal priority feedback from delivery device 220. Note that in some embodiments, the media items being distributed correspond to media items being delivered to end users by distribution device 210, which can also act as a delivery device.

In embodiments where multiple different delivery devices provide temporal priority feedback, the optimal order of items being distributed can vary on a per device/system/market basis. Although the discussion focuses primarily on feedback from a single device, i.e. delivery device 220, the techniques and teachings apply equally to including multiple devices/systems/markets.

As illustrated by block 223, content, assets, media items, preview messages, and other data transferred by distribution device 210, for example via WANcasting®, is received by delivery device 220 at a WANcast™ receiver. Delivery device 220 determines the temporal priority of media items referenced or included in the media asset transfer, as illustrated by block 224. Determining a temporal priority can involve one or more sub-processes, as illustrated by blocks 225, 233, and 235.

As illustrated by block 225, media items are checked to determine if they are scheduled for delivery to media consumers via broadcasting, streaming, or otherwise. In some embodiments, media items that are scheduled for delivery sooner are assigned higher temporal priorities than media items scheduled for later deliveries, and media items not included in a broadcast or streaming schedule are assigned even lower priorities.

In some embodiments, even if an item is not currently scheduled for broadcast or distribution, a commonly requested media item can be assigned a higher temporal priority than a less commonly requested media item, because it is more likely that a commonly requested media item will be need to be delivered sooner than a less commonly requested media item. This can be especially useful in, but is not limited to, systems configured to permit a media consumer to submit "instant", or "rush" requests for changes to media stream previously populated with media items.

In addition to determining whether an item is scheduled to play, a check of a media item's scheduling priority at block 233 can determine whether delivery device 220 has a copy of a particular media item already stored locally, as illustrated by blocks 231 and 229, or whether a media item is more readily available from another source. For example, if a streaming radio player included in delivery device 220 has access to a media consumer's personal library, it might be preferable to obtain the scheduled media item from the media consumer rather than from distribution device 210. In other implementation, delivery device 220 can store a copy of media items already delivered to one media consumer in a locally accessible database, and use the stored copies rather than copies provided by distribution device 210.

As illustrated by block 227, after a temporal priority has been associated with, or assigned to, a particular media item or group of media items in block 224, delivery device 220 can provide temporal priority feedback to distribution device 210 to allow distribution device 210 to adjust the order in which it delivers media items via media asset transfer. In some embodiments, the temporal priority feedback can be a stand-alone message, while in other embodiments the temporal priority feedback is included in another message normally transmitted as part of the media asset transfer process. At the scheduled time, playout server 237 delivers scheduled media items for consumption by media consumers via broadcast, streaming, or otherwise.

Figure 3:
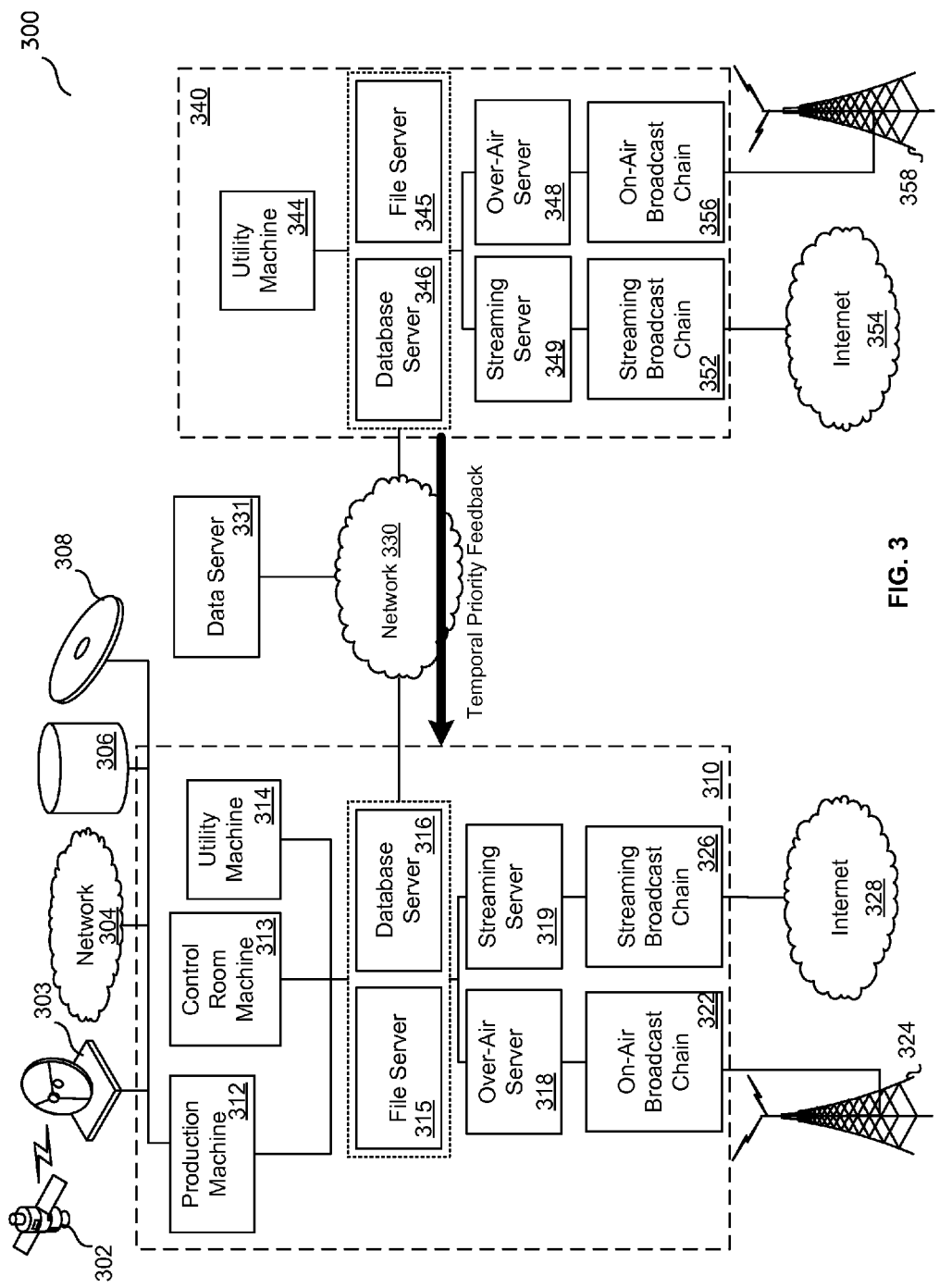
FIG. 3 is a diagram illustrating a first radio broadcasting system acting as a media distribution system and a second radio broadcasting system acting as a media delivery system, according to various embodiments of the present disclosure.

Referring next to FIG. 3, a system 300 according to various embodiments of the present disclosure will be discussed. System 300 includes a first radio broadcast station 310 and a second radio broadcast station 340 that are communicatively coupled via a network 330, such that content can be transferred between the two broadcast stations via media asset transfer. Radio broadcast stations 310 and 340 can be included in one or more processing systems which can be remotely-located from each other. In some embodiments, broadcast stations 310 and 340 can be included in one or more processing systems which can be co-located, at least in part, in one or more physical facilities. The network 330 can be the Internet and can be communicatively coupled to a third entity, which can include a data server 331, where some information and controls related to the broadcast stations 310 and 340 can be located.

As shown in the illustrated embodiment, broadcast station 310 can include streaming broadcast chain 326, through which a streaming broadcast of content can be provided to a network such as Internet 328, on-air broadcast chain 322, through which content can be broadcast via a broadcast tower 324, and various content sources such as an individual source content 308, bulk content storage 306, programming from another market and received via network 304, and programming broadcast via satellite 302, which can be received via satellite receiver 303. The illustrated broadcast station 310 includes production machine 312, which receives content from network 304, bulk storage 306, individual source content 308; control room machine 313, and utility machine 314, each of which is connected to database server 316 and file server 315.

The illustrated radio broadcast station 310 also includes over-air server 318, which provides content to on air broadcast chain 322; and streaming server 319, which provides content to streaming broadcast chain 326. File server 315 can store various data, including, without limitation, content items provided from production machine 312, utility machine 314, and control room machine 313. Database server 316 can store various data, including, without limitation, content metadata, broadcast schedules, and information associated with various other processing systems, including information associated with radio broadcast station 340 and data server 331. File server 315 and Database server 316 can provide data to one or both of over-air server 318 and streaming server 319.

In some embodiments, one or more of the illustrated servers can be implemented as virtual servers implemented on the same hardware as another of the illustrated servers. Furthermore, various distributed processing techniques can be used to spread functionality of one or more of the illustrated servers across multiple different machines. For example, some processing techniques associated with one or more of the illustrated machines and servers of radio broadcast station 310 can be located at data server 331, such that some functionality associated with system 300 can be implemented from data server 331. In another example, some information can be stored on data server 331 and accessed by one or more machines and servers of radio broadcast station 310.

Radio broadcast station 310 can receive ("ingest") content to be played back, broadcasted, distributed, some combination thereof, or the like from various sources. For example, production machine 312 can obtain information from broadcasts in other markets, including content broadcast in the other markets, via network 304. Production machine 312 can also obtain content from database 306, which may be a database local to production machine 312, or local to another server or machine that is part of radio broadcast station 310. In some embodiments, database 306 can be maintained by a content provider separate from either radio broadcast station 310 or 304. For example, database 306 can be located on data server 331. Production machine 312 can also obtain content to be broadcast from individual sources, such individual source content 308, which may include any of various non-volatile media storage elements, including but not limited to optical disks, e.g. compact discs (CDs), digital video disks (DVDs), various types of magnetic and electromagnetic storage media, or the like.

Production machine 312 can provide some or all of content to be distributed to file server 315. Production machine 312 can also provide some or all of data associated with the content, including content metadata, to one of file server 315 and database server 316. In addition to the content provided to file server 315 from production machine 312, satellite receiver 303 can also provide satellite content to be pro into a broadcast via over-air audio server 112 and streaming audio server 111. File server 315 and database server 316 can also receive content from control room machine 313. Control room machine 313 may include a studio in which a live content is being generated for broadcast, such as a talk show or other similar live program, but control room machine 313 can also provide content to file server 315 other than live content. Additionally, control room machine 313 can provide file server 315 and database server 316 with various control functions, and in some cases an operator can manually add or remove content that has previously scheduling for broadcast. Such manipulations of scheduling can involve interacting with a content playback schedule stored on a server, such as database server 316, where the playback schedule indicates one or more schedules for playback of content items by one or more radio broadcast stations. Thus, for example, an operator of control room machine 313 may determine that a previously scheduled content item in a particular daypart is not to be broadcast for any of various reasons. Upon making that determination, control room machine 313 can be used to send a signal to database server 316. In response to the signal, database server 316 can remove the content item from a previously-scheduled time slot. In some embodiments, the removed, or "bumped" content item is not delivered to over-air server 318 for on-air broadcast, nor is it delivered to streaming server 326 for streaming broadcast.

As used hereinafter, playback of a content item can include, without limitation, playing some or all of a content item on a device, and providing some, or all, of the content item for distribution by a processing system, including, without limitation, via on-air broadcast and streaming over a network. Playback can also include, without limitation, selecting and distributing selected portions of one or more content items, including clips, excerpts, and the like.

In various embodiments, content provided by streaming server 319 to streaming broadcast chain 326 is the same content provided by over-air server 318 to on air broadcast chain 322. In many instances, however, content provided to on air broadcast chain 322 and streaming broadcast chain 326 can vary, even though the length and timing of the content themselves are generally consistent with each other.

In some embodiments, radio broadcast station 310 can utilize a media asset transfer, such as WANcasting® to transfer content produced at radio broadcast station 310 to radio broadcast station 340, such that radio broadcast station 340 receives content in a produced form independent of a capability, local to radio broadcast station 340, to produce content. For example, a media program content item received at satellite dish 303 of radio broadcast station 310 via satellite 302, and produced via production machine 312, can be transferred from radio broadcast station 310 to radio broadcast station 340 via a connection over network 330, such that the media program content item can be provided to one or more over-air and streaming servers 348, and 349, respectively, to be provided to respective broadcast chains 356 and 352 and broadcast from a broadcast tower 358 and provided via a network such as the Internet 354, respectively. In some embodiments, content and information stored in file servers 315 and database server 316 can be transferred to file server 345 and database server 346, respectively.

When performing a media asset transfer of media items or other content/assets to radio broadcast station 340, radio broadcast station 310 can determine which media items should be broadcast, and the order in which they should be broadcast, based on temporal priority feedback received from radio broadcast station 310. The temporal priority feedback can include a score or other indicator that specifies a temporal priority of individual media items, from the perspective of radio broadcast station 340. For example, if a particular media item is scheduled to be delivered to media consumers via both on-air broadcast chain 356 and via streaming broadcast chain 352 during the current broadcast day, and radio broadcast station 340 does not have the media item already stored in file server 345 or database server 346, radio broadcast station 340 can assign a high temporal priority to the media item. If the media item were needed only for streaming, a different, and possibly lower, temporal priority could be assigned to the media item. However, in some embodiments, if the media item is not currently available, and is included in a broadcast schedule for any device in either on-air broadcast chain 356 or streaming broadcast chain 352, a high temporal priority can be assigned.

In some embodiments, transfers of content can be initiated based on information associated with a potential receiving processing system indicating an interest by the potential receiving processing system in receiving the content to be transferred. Such information can include various criteria associated with the potential receiving processing system, including preferences regarding certain parameters associated with content. For example, information associated with radio broadcast station 340 can include preferences for content of certain genres, artists, albums, lengths, some combination thereof, and the like. Criteria can also, in some embodiments, include scheduling information associated with the processing system. For example, information associated with radio broadcast station 340 can include a schedule for playback of certain content items at certain times over certain distribution channel, such as a scheduled broadcast of a particular nationally-syndicated radio program at a particular time over broadcast tower 358. In some embodiments, radio broadcast station 310 can transfer content to radio broadcast station 340 based on determining a correlation between content stored at one or more of file server 315 and database server 316 with information associated with radio broadcast station. For example, upon a determination that a particular content item stored in file server 315, with associated metadata stored in database server 316, is scheduled for playback at radio broadcast station 340 and is not currently stored at radio broadcast station 340, the particular content item and associated metadata can be transferred to the appropriate servers of radio broadcast station 340.

In some embodiments, the information associated with a processing system can be accessed by the system managing transfers of content between processing systems. For example, in the illustrated embodiment, where transfers of content from radio broadcast station 310 are controlled by a media asset distribution module local to utility machine 314, information associated with radio broadcast station 340, for example a temporal priority score, can be accessed by the media asset transfer module and analyzed to determine if any information, criteria, or the like associated with radio broadcast station 340 correlates with data stored in servers 315 and 316. Information associated with the radio broadcast station 340 can be accessed by some part of radio broadcast station 310, and a copy thereof can be stored locally to radio broadcast station 310, such as in database server 316. Accessed information can be analyzed for correlation at various times, including upon accessing, upon production of content at production machine 312, at certain time intervals, and the like. In some embodiments, utility machine 344, located at radio broadcast station 340, can manage some or all of the distribution of WANcasting® content items and other media assets to radio broadcast station 340, utilizing transferred content items, and the like.

In some embodiments, information associated with various processing systems is located remotely from one or more of the processing systems. For example, in the illustrated embodiment, information associated with radio broadcast station 340, such as a content playback schedule for providing content to over air server 348 and streaming server 349, is located at data server 331 and is accessed by some part of radio broadcast station 310 to determine whether to transfer content from radio broadcast station 310 to radio broadcast station 340. Information can be provided to data server 331 through various means, including, without limitation, accessing information from radio broadcast station 340 by the data server 331, transferring information to the data server 331 by the radio broadcast station 340, and the like.

Figure 4:
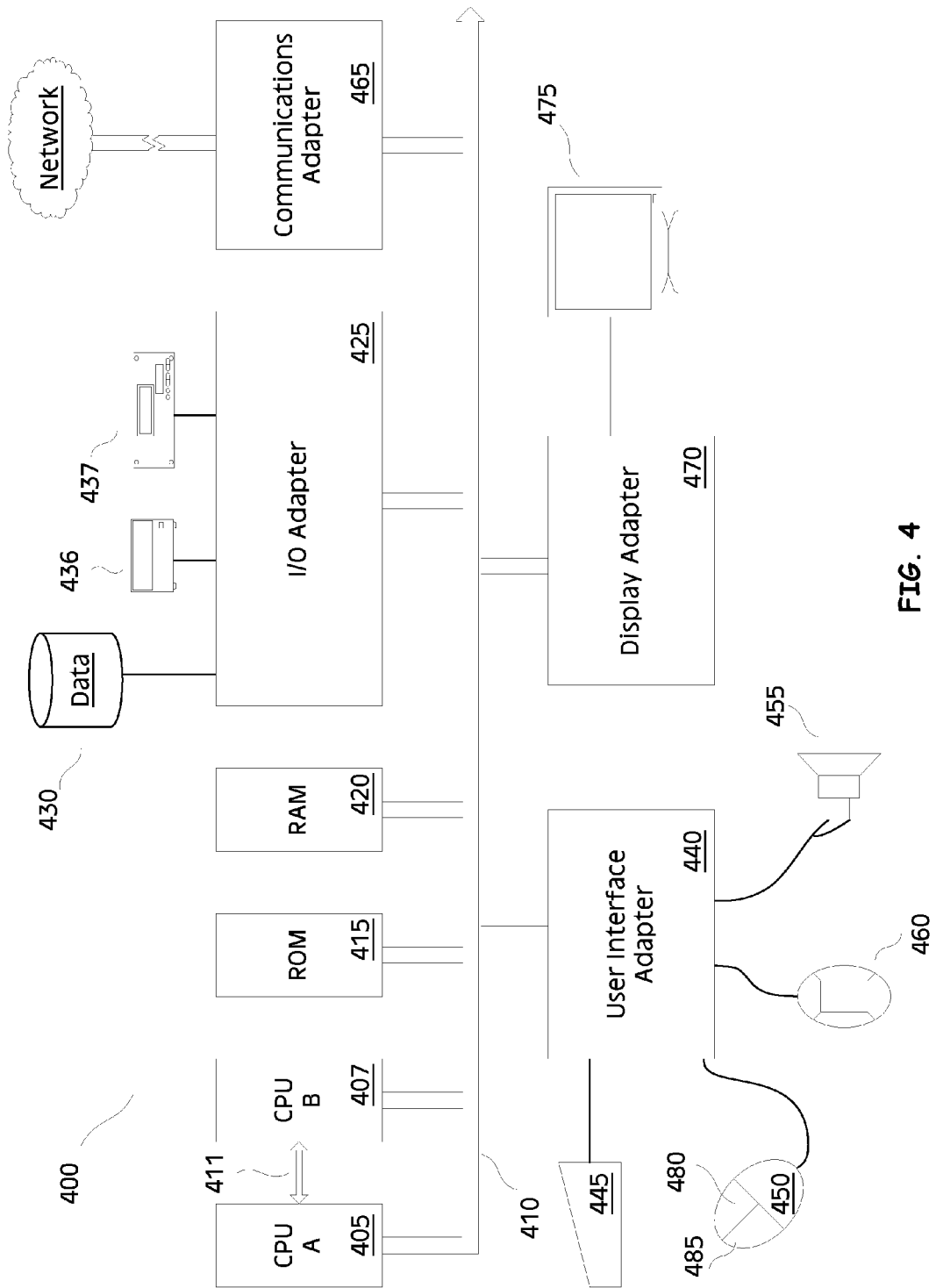
FIG. 4 is a computing device according to various embodiments of the present disclosure.

Referring now to FIG. 4, a high-level block diagram of a processing system is illustrated and discussed. Processing system 400 includes one or more central processing units, such as CPU A 405 and CPU B 407, which may be conventional microprocessors interconnected with various other units via at least one system bus 410. CPU A 405 and CPU B 407 may be separate cores of an individual, multi-core processor, or individual processors connected via a specialized bus 411. In some embodiments, CPU A 405 or CPU B 407 may be a specialized processor, such as a graphics processor, other co-processor, or the like.

Processing system 400 includes random access memory (RAM) 420; read-only memory (ROM) 415, wherein the ROM 415 could also be erasable programmable read-only memory (EPROM) or electrically erasable programmable read-only memory (EEPROM); and input/output (I/O) adapter 425, for connecting peripheral devices such as disk units 430, optical drive 436, or tape drive 437 to system bus 410; a user interface adapter 440 for connecting keyboard 445, mouse 450, speaker 455, microphone 460, or other user interface devices to system bus 410; communications adapter 465 for connecting processing system 400 to an information network such as the Internet or any of various local area networks, wide area networks, telephone networks, or the like; and display adapter 470 for connecting system bus 410 to a display device such as monitor 475. Mouse 450 has a series of buttons 480, 485 and may be used to control a cursor shown on monitor 475.

It will be understood that processing system 400 may include other suitable data processing systems without departing from the scope of the present disclosure. For example, processing system 400 may include bulk storage and cache memories, which provide temporary storage of at least some program code in order to reduce the number of times code must be retrieved from bulk storage during execution.

The present disclosure has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present disclosure may have also been described, at least in part, in terms of one or more embodiments. An embodiment of the present disclosure is used herein to illustrate the present disclosure, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

Various disclosed embodiments can be implemented in hardware, software, or a combination containing both hardware and software elements. Some embodiments can be implemented in software, which includes but is not limited to firmware, resident software, microcode, etc. Some embodiments can be realized as a computer program product, and may be implemented as a computer-usable or computer-readable medium embodying program code for use by, or in connection with, a computer, a processor, or other suitable instruction execution system.

For the purposes of this description, a computer-usable or computer readable storage medium can be any tangible medium that can contain, store, communicate, or transport the program for use by or in connection with an instruction execution system, apparatus, or device. However, as used herein, the term "computer readable medium" specifically excludes transitory signals. By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer-usable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While particular combinations of various functions and features of the present disclosure have been expressly described herein, other combinations of these features and functions are likewise possible. The present disclosure is not limited by the particular examples disclosed herein and expressly incorporates these other combinations.

What is claimed is:

1. A system for network transmission of media files, the system comprising:
a plurality of media delivery devices coupled to a media distribution device via a communications network;
the media distribution device configured to determine an estimated temporal priority for each of a plurality of media files;
the media distribution device further configured to transmit a preview message to the plurality of media delivery devices, the preview message including:
a list of media files expected to be transmitted to the plurality of media delivery devices by the media distribution device, wherein the preview message is transferred in advance of distributing media files included in the list of media files expected to be transmitted;
information relating to a period of time in which each media file included in the list of media files is scheduled to be transmitted; the plurality of media delivery devices configured to:
determine, based at least in part on the preview message and on broadcast schedules used by the plurality of media delivery devices, an independent temporal priority of each of the plurality of media files transmitted by the media distribution device;

transmit independent temporal priority feedback messages to the media distribution device indicating an independent temporal priority of each of the plurality of media files; and the media distribution device further configured to:
determine an order of transmission for each of the plurality of media files based on a comparison between the estimated temporal priority and the independent temporal priority of each of the plurality of media files; and
transmit the media files to the plurality of media delivery devices in the order of transmission.

2. The system of claim 1, wherein the media delivery devices are further configured to:
determine a temporal priority of an expected media item identified in the preview message; and
wherein at least one temporal priority feedback message includes an indication of the temporal priority of the expected media item.

3. The system of claim 1, wherein the media delivery devices are further configured to:
set a temporal priority of a scheduled media item based on whether the media delivery devices already have access to a sufficient portion of a scheduled media item to allow delivery of the scheduled media item.

4. The system of claim 1, wherein the media delivery devices are further configured to:
set a temporal priority of a changed media item based on whether the changed media item includes changes other than metadata changes.

5. The system of claim 1, wherein the preview message indicates times at which different media files listed in the preview message are scheduled to be transmitted.

6. The system of claim 1, wherein at least one of the independent temporal priority feedback messages includes a request for a media file not included in the preview message.

7. A method for use in network transmission of media files, the method comprising:
determining, by a media distribution device, an estimated temporal priority for each of a plurality of media files;
transmitting, by the media distribution device, a preview message to a plurality of media delivery systems, the preview message including:
information relating to a list of media files expected to be transmitted to the plurality of media delivery systems by the media distribution device, wherein the preview message is transferred in advance of distributing media files included in the list of media files expected to be transmitted;
information relating to a period of time in which the plurality of media files are scheduled to be transmitted;
receiving, at the media distribution device, a plurality of independent temporal priority feedback messages from the plurality of media delivery systems, the plurality of independent temporal priority feedback messages indicating temporal priorities of each of the plurality of media files, as determined, based at least in part on the preview message and broadcast schedules used by individual media delivery systems of the plurality of media delivery systems, by respective media delivery systems of the plurality of media delivery systems;
determining, at the media distribution device, an order of transmission for each of the plurality of media files based on a comparison between the estimated temporal priority and an independent temporal priority of each of the plurality of media files; and
transmitting, from the media distribution device, each of the plurality of media files to the plurality of media delivery systems in the order of transmission.

8. The method of claim 7, wherein the plurality of independent temporal priority feedback messages indicate temporal priorities of an expected media item.

9. The method of claim 7, wherein a temporal priority of a scheduled media item is determined based on whether a particular media delivery system already has access to a sufficient portion of the scheduled media item to allow delivery of the scheduled media item.

10. The method of claim 7, further comprising:
stopping transmission of at least a portion of a changed media item to at least one of the plurality of media delivery systems based on whether the changed media item includes only metadata changes.

11. The method of claim 7, wherein the preview message indicates times at which different media files listed in the preview message are scheduled to be transmitted.

12. The method of claim 7, wherein at least one of the plurality of independent temporal priority feedback messages includes a request for a media file not included in the preview message.

13. A method for use in network transmission of media files, the method comprising:
receiving, at a first media delivery device of a plurality of media delivery devices, a preview message including:
information relating to a list of a plurality of media files expected to be transmitted to the first media delivery device by a media distribution device, wherein the preview message is transferred in advance of distributing media files included in the list of media files expected to be transmitted in a first order, and wherein the first order is set based on an estimated temporal priority determined in the absence of a temporal priority feedback message from one or more of the plurality of media delivery devices;
information relating to a period of time in which the plurality of media files are scheduled to be transmitted via a packet switched communications network,
determining, at a first media delivery device, a first temporal priority of one of the plurality of media files based on the preview message and a broadcast schedule known to the first media delivery device;
transmitting from the first media delivery device, a first temporal priority feedback message to the media distribution device, the first temporal priority feedback message indicating the first temporal priority of each of the plurality of media files, as determined by the first media delivery device; and
receiving, at the first media delivery device, each of the plurality of media files from the media distribution device in a second order, different from the first order, wherein the second order is determined based, at least in part, on a comparison of the estimated temporal priority and the first temporal priority indicated in the first temporal priority feedback message.

14. The method of claim 13, further comprising:
determining the first temporal priority of an expected media item based on whether the first media delivery device already has access to a threshold portion of the expected media item.

15. The method of claim 13, further comprising:
requesting the media distribution device to stop transmission of at least a portion of a changed media item based on whether the changed media item includes only metadata changes.

16. The method of claim 13, wherein the preview message indicates times at which different media files listed in the preview message are scheduled to be transmitted.

17. The method of claim 13, wherein the first temporal priority feedback message includes a request for a media file not included in the preview message.

\* \* \* \* \*